Jan. 5, 1943.                J. R. PARSONS                2,307,332
                       REINFORCED CERAMIC MATERIAL
                           Filed May 9, 1938
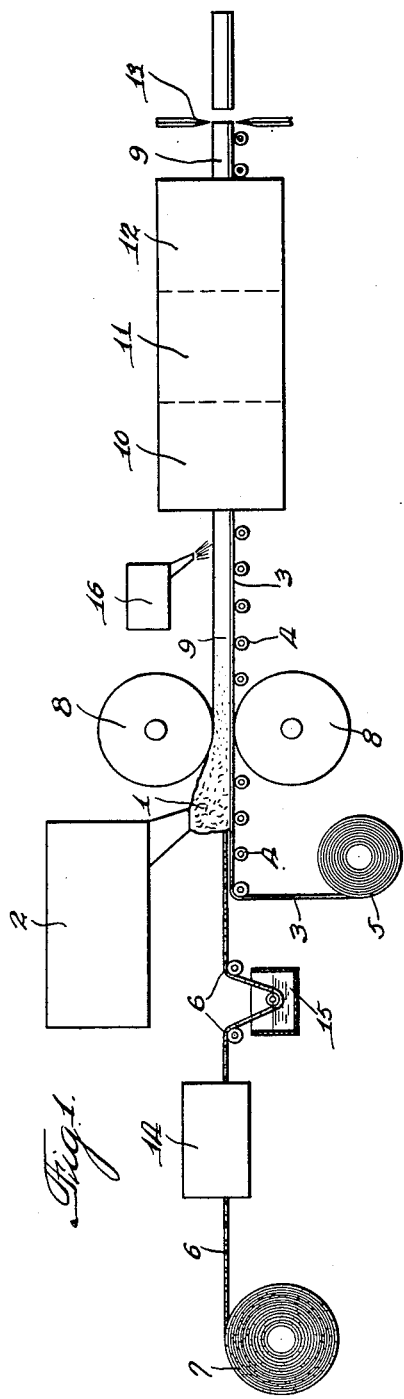
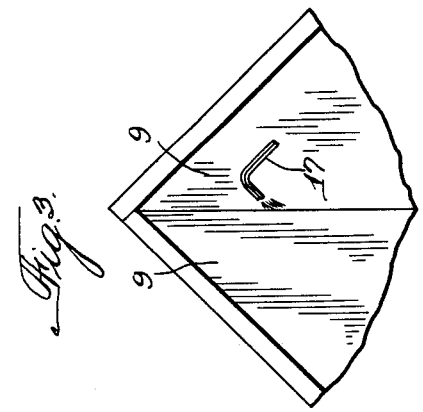
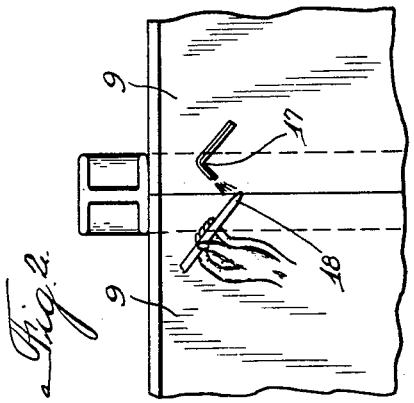
Inventor
Joseph R. Parsons
By Ames, Thies, Olson & Mickelwurger
Attys.

Patented Jan. 5, 1943

2,307,332

UNITED STATES PATENT OFFICE 2,307,332

REINFORCED CERAMIC MATERIAL

Joseph R. Parsons, Gypsum, Ohio, assignor to United States Gypsum Company, Chicago, Ill., a corporation of Illinois Application May 9, 1938, Serial No. 206,816

13 Claims. (Cl. 72—40)

This invention relates to a ceramic material and more particularly to reinforced ceramic building material.

This invention has for an object the provision of a ceramic material that is useful for construction where light, flexible, and readily installable building units are required. Ceramic materials such as brick, terra cotta, tile, glass, and the like have been used to a large degree in the past in building construction. Such ceramic materials have the advantage over wood and other building materials in that they are water resistant, fireproof, and almost indestructible. The use of the above-mentioned ceramic materials for building construction also has many disadvantages, among these being the great weight of such materials, which necessitates heavy foundations for buildings, as well as the difficulty with which these ceramic materials are installed. Bricks, tile, and glass blocks must be joined together with mortar, and skilled labor is required to construct buildings from these materials. Also, it is necessary that ceramic products be prepared in small units in order to prevent them from breaking or shattering during their transportation. It is, therefore, desirable to produce a ceramic material that is light in weight, flexible, and capable of being transported and set up in a construction in large units with a minimum of labor.

A further object of this invention is the provision of a shatter-resistant ceramic product.

A further object of this invention is the provision of a ceramic building unit of considerable size which is capable of being readily installed by unskilled labor and is resistant to shattering.

A further object of this invention is the provision of a ceramic building unit that may be readily fastened by nails and screws to other building units.

A further object of this invention is the production of ceramic building units which may be joined by fusion or welding.

A further object of this invention is the provision of a method for joining or welding the reinforced ceramic materials of this invention in order to form a monolithic structure.

Further and additional objects of this invention will appear hereinafter.

In the drawing,

Figure 1 illustrates diagrammatically a preferred method whereby the article of this invention may be fabricated;

Fig. 2 illustrates the method for welding two abutting units of material prepared in accordance with this invention; and Fig. 3 illustrates a method for welding together two angularly abutting units of the ceramic material prepared in accordance with this invention.

The product of this invention comprises an aggregate of thermostable inorganic particles and thermostable reinforcing means which have been interbonded by means of a bonding agent that has a lower fusion point than the particles or the reinforcing material. This product may be prepared, in general, by thoroughly mixing the particulate material with the bonding agent, preferably in the powdered form. The resulting mixture may be incorporated with the reinforcing means by any suitable method, and the resulting mixture or aggregate may be subjected to a temperature sufficient to fuse the bonding agent but insufficient to fuse the particulate material or the reinforcing agent. The product, on cooling, is thus a mass of particulate material bonded together at a point-to-point contact by means of a solid bond, the whole being reinforced and bonded integrally with the reinforcing material.

According to a preferred embodiment of this invention, a bonding agent in the powdered form, such as a glaze or enamel, may be mixed dry with the aggregate or particulate material. Such particulate material may comprise any type of argillaceous material such as ground brick and the like. The resulting mixture may be thoroughly incorporated with water or another fluid to form a paste possessing such a plasticity that it may be readily incorporated with any type of reinforcing means such as expanded metal lath, wire screen, and the like. The resulting mass is then preferably dried and subjected to a temperature for a time sufficient to fuse the bonding agent incorporated in the material but insufficient to fuse either the particulate material or the reinforcing material.

The bonding agent used in preparing the article described in this invention may be any type of substance that will form a bond between the particles of the material and the reinforcing means. These substances may be selected from those materials known in the ceramic industry as glazes or enamels. A suitable enamel may be prepared by mixing in the dry state suitable quantities of flint, feldspar, and fluxes such as soda ash, sodium nitrate, litharge, zinc oxide, borax, etc. Opacifiers and pigments may also be incorporated into the enamels or glazes if desired.

The inorganic aggregate or particulate material may comprise a large number of thermostable inorganic substances which have in general a higher fusion point than the bonding agent used.

Suitable substances are ceramic or argillaceous material, such as crushed brick, waste pottery, brick grog, and the like. Other substances may also be used, such as sand, cinders, and crushed igneous rock. A thermostable substance in the sense of this disclosure is a substance that will not decompose at the temperature to which it is heated in the process.

The reinforcing means that may be used in an article as described and prepared in accordance with this invention may be selected from a wide variety of materials. For example, metallic reinforcement may be used as described in the preferred embodiment of this invention, such as expanded metal lath, wire screens, wire rods, metal wool, and the like. However, it is not necessary that the reinforcing means be limited to metallic substances, since rock wool, asbestos fibers, cyanite fibers, etc., may also be used. It is often desirable, as is shown in a preferred embodiment of this invention, to employ mineral fibers as a reinforcing means in conjunction with the metallic elements.

In order to more specifically describe the product of this invention and the means whereby it may be produced, a specific example is set forth wherein a method is described for producing the reinforced ceramic product of this invention. The example given is for illustrative purposes only and is not to be construed as limiting the scope of this invention. According to the preferred form, a paste may be prepared by thoroughly incorporating in any desired manner the bonding agent, the aggregate particles, water, and any other suitable material. A suitable paste may have the following composition by weight:

| | Parts |
|---|---|
| Finely ground enamel | 40 |
| Ground brick | 55 |
| Asbestos fiber | 5 |

Water—suitable quantity to form a smooth paste.

The paste may then be extruded onto and around a layer of expanded metal lath, screen, or wire mesh in such a manner as to embrace the latter. The resulting layer of paste and reinforcing means may then be preformed into the desired shape by suitable rollers or other compacting means in any desired manner. The resulting sheet or mass may then be dried and subjected to sufficient heat in any suitable type furnace in order to fuse the enamel or bonding agent within the mixture. The aggregate particles and reinforcing material are thus fused together by means of the bonding agent and have a point-to-point contact. The resulting product consequently has a somewhat porous structure. If desired, the resulting product may be passed through an annealing furnace in order to remove strains set up in the product during heating.

Reference is now made to Fig. 1. Paste 1 may be prepared from the aggregate, the bonding agent, and water in any suitable manner in a battery of grinding, mixing, and pugging mills 2 and extruded onto a conveyer 3. In the preferred embodiment shown, the conveyer 3 comprises a sheet of paper or other sheet material passing over rotating rolls 4 from spool 5. A sheet of wire screen or mesh 6 from reel 7 may pass over, parallel to and in the same direction as conveyer 3. Paste 1 may be extruded onto conveyer 3 and intimately associated with and surround the wire screen or reinforcing material 6. The paste 1 and the reinforcing material 6 are preferably continuously conveyed on conveyer 3 through pressure rollers 8 or other suitable means in order to preform the product into sheet material 9 and in order to firmly compact the paste 1 around the reinforcing material 6. Sheet 9 may then pass into a suitable drier 10 in order to remove the water from the paste material. Sheet 9 subsequently passes to furnace 11 wherein it is subjected to a temperature sufficient to fuse the bonding agent within the mixture but insufficient to fuse the aggregate particles or the reinforcing material. Temperatures suitable for this process may vary from about 1400° F. to 2300° F., depending on the material used for manufacturing the product and the time that the product remains in the furnace. It may be desirable to subject the product to a suitable annealing furnace 12 after it is removed from the firing furnace 11. The product, on removal from the annealing furnace, may be cut into suitable lengths by shears 13.

The sheet of ceramic material prepared in accordance with this invention may be of any size or thickness, which may directly depend upon the amount of paste extruded upon conveyer 3, the proximity of the preshaping rolls 8, and the rate at which the product passes through the furnace. The ceramic sheet material prepared and described above may have some heat and sound-proofing properties. It is light in weight, a sheet ¼ inch thick having a weight of about 2.5 pounds per square foot.

In order thoroughly to clean it, the reinforcing material 6 is preferably treated by a sand blast in chamber 14. It may also be passed through an alkali bath in order further to clean it and permit the bonding agent in the product to adhere more firmly to the reinforcing material. Any suitable alkaline substance may be used for cleaning the reinforcing material, such as sodium hydroxide, sodium carbonate, trisodium phosphate, and the like.

If desired, the sheet material 9 as described above may also be treated with a suitable glaze introduced onto the sheet from container 16 before drying.

Conveyer 3 is preferably paper or some other organic fibrous sheet material which is useful for holding the paste around the reinforcing material 6 before firing in furnace 11. During the firing, this sheet material ordinarily burns off. It is possible, however, to use a mineral fibrous sheet material such as prepared from asbestos or mineral wool and which will not burn off in the firing furnace but become directly incorporated into the sheet material during the firing operation. In certain instances sheet 3 may even be replaced by the reinforcing means 6.

The temperature of the furnace may depend to a large degree upon the time of contact of the material within the furnace, the thickness of the product, and the materials from which the product is prepared. In the preferred embodiment shown above, wherein a metal screen or mesh is used as the reinforcing material, ground brick as the aggregate material, and enamel as the bonding agent, temperatures from 1400° F. to 2300° F. are usually sufficient. The enamel or bonding material will fuse at this temperature, thus causing the particles and the reinforcing material to be bonded together substantially at a point-to-point contact. If mineral fibers are used as the reinforcing means, however, it may be desirable in certain instances to heat the material to temperatures as high as 2600° F. Furthermore, it is possible, if the bonding agent is present in an extremely finely divided state, that temperatures from 400° F. to 1600° F. may suffice without actual fusion of the bonding material. It is not contemplated that this invention be limited in any manner by the temperature that may be employed during the manufacture of the herein-described product. Any type of furnace may be used, such as induction furnaces, electric furnaces, muffle furnaces, gas or coal-fired furnaces, and the like. By slight variations in the process as described above, it is apparent that the process may be made intermittent as well as continuous. The hot material may be smoothed by pressure rollers, if desired, on removal from the furnace. Furthermore, it is not necessary to employ in all instances a drier for the paste or an annealing furnace for the product as described in the above embodiment.

A particular feature of the product of the herein-described invention is that several units of the material may be integrally fastened together by a nonmetallic weld.

Fig. 2 illustrates a method whereby two abutting units may be welded together by the use of an oxyacetylene torch 17 and a so-called welding stick 18. The welding stick 18 may comprise a suitable filler and an inorganic nonmetallic bonding agent similar to that used in the construction of the structural unit. An application of high heat from the torch 17 will fuse the bonding agent in the stick and in the unit, permitting a mutual welding of the units. A strong weld results when the material is subsequently cooled.

Fig. 3 shows diagrammatically two angularly abutting units to form an outside corner. The oxyacetylene torch 17 may be applied directly to the points in contact without the use of a welding stick, if desired, and the bonding agent within the units will fuse on heating and flow together, thus forming an integral structure as described above.

A further desirable feature of the product of this invention is that it may be heated by any suitable method and be bent or formed into a predetermined shape. For example, a ¾ inch sheet of the product may be bent around corners by the application of heat to the material. The bonding material becomes softened, permitting a shaping of the sheet. The reinforcing holds the sheet together and prevents breaking. On cooling, the sheet may then assume its original rigidity.

In the preferred embodiment of this invention, as described above, only a method for producing a reinforced ceramic product in the sheet form is shown. It will be readily realized, however, that reinforced products of various shapes and sizes may be produced by slight modification of the apparatus without departing from the spirit and the scope of this invention. The product is particularly adaptable as a ceramic material for building units since no mortar is necessary and the product may be readily attached to surrounding structures by means of clips, nails, screws, and the like. Further, they may be joined to each other, if desired, by the above-mentioned welding process. If desired, any type of decorative glaze may be incorporated into the material during the process of manufacture.

The reinforcing material may be incorporated in the manner shown in the preferred embodiment or in any other manner. For example, the reinforcing material may be added during the mixing of the aggregate material and the bonding agent, and particularly where such reinforcing material is in the form of fibers. It may be desirable in some instances to employ both a fibrous reinforcing material and a metallic nonfibrous reinforcing material as is shown in the preferred embodiment of this invention. The asbestos or mineral wool fibers impart a degree of flexibility to the resulting product.

Other materials than those mentioned above may also be incorporated if desired, such as clay, mica, pyrophyllite, and other materials. Such substances are sometimes desirable since they may impart desirable properties to the paste during the manufacture or to the resulting product.

The ceramic material of this invention has therefore all the qualities of the ceramic materials that have been used in the past for building structures. They are durable and fire-proof. They may be made available in any desired shape or size and may be conveniently transported and set up with a minimum danger of breakage in large sheets. They may be fastened by nails, screws, or clips directly to supports by unskilled workmen, and no mortar is necessary to bind them together. If desired, they may also be integrally welded and bent by the methods hereinbefore described. The product may vary widely, depending upon the materials used in production and the conditions of firing. Suitable decorative glazes may be incorporated, if desired, as in the case of other ceramic products.

The product may be used in building structures, in addition to a wall structure, as indicated hereinbefore, as exterior or interior sheathing, flooring, roofing, reinforced structural members, studs, and beams. Other uses for the product of this invention will readily occur to those skilled in the art.

While a particular embodiment of this invention is shown above, it will be understood, of course, that the invention is not to be limited thereto, since many modifications may be made, and it is contemplated, therefore, to cover any such modifications as fall within the true spirit and scope of this invention as defined by the appended claims.

Claims directed to the method of producing the ceramic article disclosed herein have been divided out of this application and appear in now pending application Serial No. 444,380, filed May 25, 1942.

I claim:

1. A relatively thin, reinforced ceramic building slab comprising an aggregate of discrete ceramic particles and a thermostable reinforcing agent, said particles being bonded to each other as well as to said reinforcing agent at their respective points of contact by means of a solidified fusible inorganic bonding material which has a fusion temperature lower than that of said particles and of said agent.

2. A relatively thin, reinforced ceramic building slab comprising an aggregate of discrete ceramic particles and a metal reinforcement, said particles being bonded to each other as well as to said reinforcement at their respective points of contact by means of a solidified fusible inorganic bonding material which has a fusion temperature lower than that of said particles and of said metal reinforcement.

3. A relatively thin, reinforced ceramic building slab comprising an aggregate of substantially discrete ceramic particles and a mineral fiber reinforcement, said particles being bonded to each other and to said fiber reinforcement at their respective points of contact by means of a solidified fusible inorganic bonding material which has a fusion temperature less than that of said particles and of said fiber reinforcement.

4. A relatively thin, reinforced building slab comprising an aggregate of discrete ceramic particles and an expanded metal reinforcement within said slab, said particles being bonded to each other as well as to said reinforcement at their respective points of contact by means of a solidified fusible bonding material having a melting point lower than that of the expanded metal.

5. A relatively thin, reinforced building slab comprising an aggregate of discrete ceramic particles and a metal screen reinforcement within said slab, said particles being bonded to each other as well as to said reinforcement at their respective points of contact by means of a solidified fusible bonding material having a lower melting point than said metal screen.

6. A relatively thin, reinforced building slab comprising an aggregate of discrete ceramic particles mixed with asbestos fibers, said particles being bonded to each other as well as to said fibers at their respective points of contact by means of a solidified fusible bonding material.

7. A relatively thin, reinforced building slab comprising an aggregate of discrete ceramic particles mixed with asbestos fibers and an expanded metal reinforcement extending within said slab, said particles, fibers and reinforcement being interbonded at their respective points of contact by means of a solidified fusible bonding material which has a fusion temperature less than that of the particles, the asbestos and the metal reinforcement.

8. A ceramic building structure comprising a plurality of ceramic building units, each of said units comprising an aggregate of discrete particles bonded together only at their respective points of contact by means of a solidified fusible inorganic bonding material, said units also being bonded together by said bonding material whereby an integral structure is produced.

9. The ceramic building structure described in claim 8 wherein each unit has a reinforcing means associated therewith.

10. The ceramic building structure described in claim 8 wherein each unit has mineral fiber reinforcing means incorporated therewith.

11. The ceramic building structure described in claim 8 wherein each unit has an expanded metal reinforcing means embedded therein.

12. A method for erecting a building structure which comprises contacting, at substantially room temperature, the edges of a plurality of ceramic building units, each unit comprising an aggregate of discrete particles bonded together only at their respective points of contact by means of a solidified fusible inorganic bonding material, heating said units only adjacent their points of contact to a temperature sufficient to fuse the bonding agent, but not the particles, in each unit whereby said agent fuses and flows together, and cooling the resulting mass to form an integral structure.

13. A method for erecting a building structure which comprises contacting, at substantially room temperature, the edges of a plurality of ceramic building units, each unit having a metallic reinforcing means embedded therein and comprising an aggregate of discrete ceramic particles, said particles being bonded to each other and to said metallic reinforcing means only at their respective points of contact by means of a solidified fusible inorganic bonding material, heating said units only adjacent their points of contact to a temperature sufficient to fuse the bonding agent, but not the particles, in each unit whereby said agent melts and flows together, and cooling the resulting mass to form an integral structure.

JOSEPH R. PARSONS.